R. L. LEACH.
VEHICLE TIRE.
APPLICATION FILED OCT. 2, 1912.
1,077,085.
Patented Oct. 28, 1913.
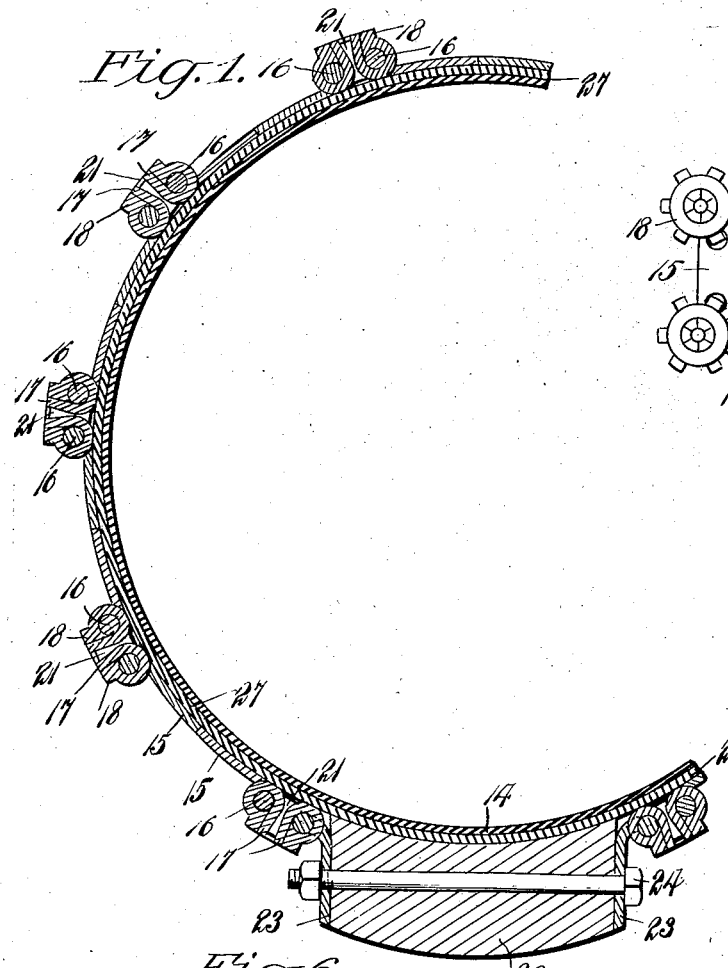
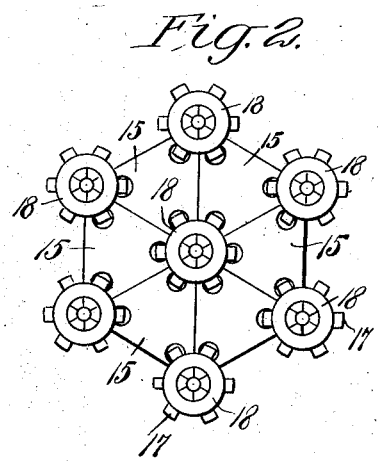
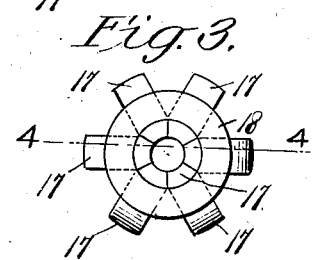
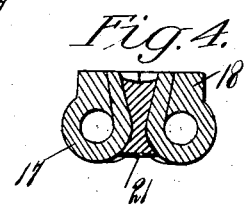
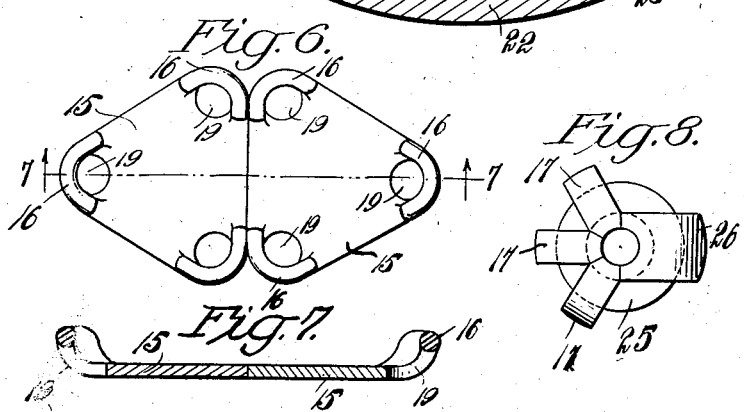
WITNESSES
INVENTOR
RICHARD L. LEACH
BY
ATTORNEYS

UNITED STATES PATENT OFFICE.

RICHARD L. LEACH, OF HONOLULU, TERRITORY OF HAWAII.

VEHICLE-TIRE.

1,077,085.      Specification of Letters Patent.      Patented Oct. 28, 1913.

Application filed October 2, 1912. Serial No. 723,511.

*To all whom it may concern:*

Be it known that I, RICHARD L. LEACH, a citizen of the United States, and a resident of Honolulu, in the county of Honolulu and Territory of Hawaii, have invented a new and Improved Vehicle-Tire, of which the following is a full, clear, and exact description.

Among the principal objects which the present invention has in view are: To provide a casing for a pneumatic tire, the surface whereof is impervious to puncture and the body whereof holds the pneumatic tube against undue or uncalculated inflation strains; and to provide a simple, efficient and economical form of construction.

Reference is to be had to the accompanying drawings forming a part of this specification, in which similar characters of reference indicate corresponding parts in all the views, and in which—

Figure 1 is a cross section of a fragment of a tire constructed and arranged in accordance with the present invention; Fig. 2 is a detail view showing a fragment of the tire casing; Fig. 3 is an enlarged detail showing the top of a jointing rivet; Fig. 4 is a cross section taken on the line 4—4 in Fig. 3; Fig. 5 is a detail view, on an enlarged scale, showing a section of a rivet in its initial or unfastened position; Fig. 6 is a detail view, on an enlarged scale, showing in juxtaposed relation two of the plates from which the present casing is constructed; Fig. 7 is a cross section taken on the line 7—7 in Fig. 6; and Fig. 8 is a detail view, on an enlarged scale, showing a bottom view of a connecting link especially designed to hold the wheel rim and adjacent casing plates.

As shown in the drawings, the tire comprises an inner tube 14. This tube is constructed in the usual manner, preferably from a good india-rubber, and has suitable valves or inflation means provided for expanding said tube.

In the present tire, the usual shoe is discarded, and an excessive inflation of the tube 14 is prevented by a casing composed of a series of triangular plates 15. The plates 15 are of any suitable dimensions. I preferably use a small plate, as rendering the casing more flexible to accommodate the rapid adaptation of the tire to the irregularities of the road. As shown in Fig. 6 of the drawings, each plate is provided at the angles thereof with raised or rounded portions 16. The portions 16 form bearings for the links 17 of each of the buttons 18. The corners of the plates 15 are cut away to permit the insertion of the links 17.

In constructing the casing, the plates 15 are assembled substantially as shown in Fig. 2 of the drawings, and the links 17 are inserted through the openings 19 in the plates and curled under the body of the buttons 18, for upward insertion within the central opening 20 of said buttons. A suitable soft rivet 21 is then inserted between the clustered ends of the links 17 and headed and expanded substantially as shown in Fig. 4 of the drawings. The rivet 21 thereafter secures the links rigidly in position. The links form flexible connectors between the plates 15, so that the outer casing formed by the plates readily adapts itself to the irregularities of the road. Those plates 15 which are adjacent the rim 22 of the wheel are directly secured to side plates 23 mounted upon the rim 22 by means of bolts 24. The plates 23 are provided with openings corresponding to the openings 19 of the plates 15, said openings being adjacent the edge of the plates 23. The plates at the edge of the casing are held by a button 25, shown in Fig. 8 of the drawings. The button 25 differs from the buttons 18 in that three of the link arms are dispensed with, and in lieu thereof one larger arm 26 is employed. The arms 26 are those which are inserted in the openings adjacent the edge of the plates 23. This construction is employed to secure the casing upon the wheel.

It will be understood that with a casing thus provided, the expansion or inflation of the tube 14 is limited and well defined. It is to prevent the soft rubber from being forced between the edges of the plates 15 and within the cups of the buttons 18 and 25 that I provide a lining 27. The lining 27 is preferably constructed from leather or other suitable flexible material. The lining may be tubular in form, or arranged with parted overlapped edges, to adapt said lining to various sizes of the casing formed by the plates 15.

It will be seen that with a casing thus constructed, the buttons 18 form studs or anti-skidding devices, and admirable traction devices for work on a relatively soft roadbed.

Having thus described my invention, I claim as new and desire to secure by Letters Patent:—

In a vehicle tire such as described; a plurality of metal plates; a plurality of circular open-centered buttons, each having a plurality of integral link extensions radially disposed and engaging the plates to secure them together, each extension passing through the opening in one of said buttons; and a plurality of rivets extending through the opening of each of said buttons and between the extensions therein, said rivets being expanded against the inner surface of said link extensions.

In testimony whereof I have signed my name to this specification in the presence of two subscribing witnesses.

RICHARD L. LEACH.

Witnesses:
FREDERICK TURRILL,
P. H. BURNETTE.